United States Patent Office 3,326,909

Patented June 20, 1967

3,326,909

MALEIC ANHYDRIDE ADDUCT WITH BICYCLO (5:5.0) DODECA-1,6-DIENE

Robert H. Perry, Jr., Springfield, N.J., assignor to Esso Research and Engineering Company No Drawing. Filed May 13, 1965, Ser. No. 455,624
1 Claim. (Cl. 260—346.3)

The present invention is directed to the isomerization of cyclododecatriene to produce novel compositions of matter. More particularly, the invention is concerned with a novel bicyclodiene compound derived from the isomerization of cyclododecatriene and the maleic anhydride adduct of the bicyclodiene compound. In its most specific aspect, the invention is directed to the isomerization of trans,trans,cis - 1,5,9 - cyclododecatriene to produce bicyclo(55.0)dodeca-1,6-diene.

The present invention may be briefly described as the isomerization of trans,trans,cis - 1,5,9 - cyclododecatriene wherein the following bicyclodiene was produced:

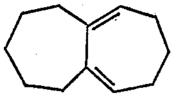

(I) Bicyclo(5.5.0)dodeca-1,6-diene

The isomerization product upon further reaction with maleic anhydride forms an adduct of the following structure:

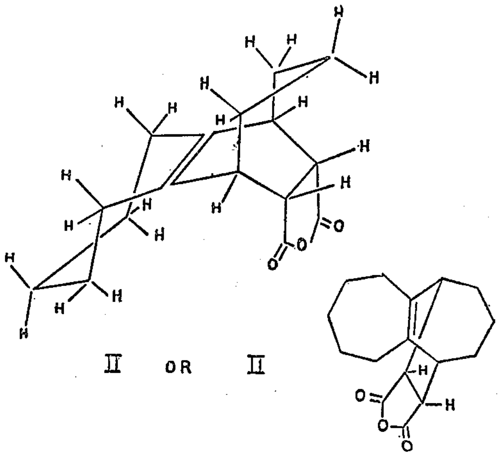

II OR II

The isomerization according to the present invention can be carried out in a variety of ways but is preferably carried out using sodium-on-alumina or sodium-on-alcoholate alumina catalyst. The catalyst is prepared by heat-treating alumina at 450° to 550° C. for 10 to 15 hours. The alumina, predominately γ-alumina monohydrate, after heating is cooled to about 150° C. in a stream of dry argon or other inert gas. Sodium is quickly added to the inert gas stream into a flask containing the heat-treated alumina. The mixture is stirred with the evolution of considerable heat while the sodium disperses on the alumina forming a blue-gray powder. After stirring for a suitable time for the sodium to completely disperse, the mixture is cooled to room temperature.

To the catalyst mixture while maintaining an inert atmosphere is added a solvent such as a paraffin, e.g. n-heptane and the trans,trans,cis-1,5,9-cyclododecatriene. The isomerization is carried out under anhydrous conditions and accordingly, it is preferred that the solvent is dried and the cyclododecatriene is freshly distilled. The mixture is heated to reflux and allowed to reflux for 10 to 24 hours. The mixture is cooled and an alcohol such as methanol is added to destroy the catalyst. To the mixture is added water to form a slurry which is filtered. The precipitate is washed with additional methanol and the filtrate is worked up with petroleum ether to recover the isomerized product.

In the isomerization of the present invention the bicyclo(5.5.0)dodeca-1,6-diene is produced as one of the products. The diene has utility as a drying oil, a solvent or thinner for paints and lacquers, or as a monomer in polymerization to make a plastic or resin. Further, the diene may be reacted with maleic anhydride to form the adduct of the present invention having the structure:

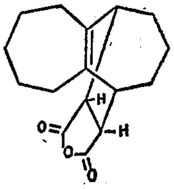

The adduct of the diene of the present invention and maleic anhydride would have utility similar to the uses of maleic anhydride per se such as an alkyd resin intermediate for surface coatings, a monomer for use in preparing polyester plastics by reaction with glycols or other polyhydric compounds, epoxy curing agent, and other applications. As in the case of maleic anhydride, the adduct of the present invention is a precursor for a large number of applications, e.g. the formation of oil additives and the like. The presence of the large hydrocarbon portion of the molecule of the adduct of the present invention would give enhanced oil solubility to the materials formed from the maleic anhydride adduct of the present invention than from maleic anhydride per se.

The invention will be further illustrated by the following specific examples which are given by way of illustration and not as limitations on the scope of the invention.

EXAMPLE I

Alumina (80–200 mesh), shown by X-ray analysis to be predominately γ-alumina monohydrate, was heat-treated at 500° C. for 10–15 hours. Fifty grams of this alumina was allowed to cool to 150° in a stream of dry argon. Five grams of sodium was quickly added to an argon stream into a flask containing the alumina. The mixture was stirred, during which time considerable heat was evolved while the sodium was dispersed on the alumina, and a blue-gray powder was formed. Stirring was continued for an additional 30 minutes and the mixture allowed to cool to room temperature.

While argon gas was passed through the flask to provide an inert atmosphere, 100 ml. of sodium-dried n-heptane was added all at once, followed by 82 g. (0.5 mol) of freshly distilled cyclododecatriene. The mixture was heated to refluxing over 15 minutes and allowed to reflux for 15 hours. The product was cooled with stirring for an additional 30 minutes. Methanol was added to destroy the catalyst, during which time the suspension turned yellow-green. To this mixture was added 100 ml. of water. The slurry was then filtered, and the flask was washed into the precipitate with several portions of methanol. To the filtrate was added 50 ml. of petroleum ether, the mixture shaken and the layers separated, and the aqueous layer was then extracted with 3–50 ml. portions of petroleum ether. The petroleum ether was washed with 2–100 ml. portions of water and the petroleum ether solution was evaporated to a non-volatile oil under vacuum, giving 78.9 g. of dark-orange, isomerized product.

EXAMPLE II

The procedure of Example I was repeated, using instead, sodium dispersed on alcoholate alumina. The isomerization reaction was carried out at approximately 90° C. over a 4-hour period. The results were comparable to those in Example I.

The products of the isomerization of Examples I and II were a mixture, one product being the bicyclo(5.5.0) dodeca-1,6-diene, which was separated from the mixture by the reaction with maleic anhydride. The preparation of the maleic anhydride adduct of the bicyclo(5.5.0)dodeca-1,6-diene is illustrated in the following example.

EXAMPLE III

To 78.9 grams of isomerized cyclododecatriene (prepared from sodium-on-alumina catalyst of Example I) in benzene (ca. 100–200 ml.) was added 50 grams of maleic anhydride, and the mixture refluxed for 72 hours. The mixture was cooled, washed with an excess of water, resulting in a severe emulsion, which was not broken up easily by addition of aqueous salt solutions. The emulsion was broken, however, by addition of ethyl ether to the benzene solution. Water extraction (6× 100 milliliters) was continued until no solid residue appeared in the evaporated water extracts. The benzene-ether solution was filtered and evaporated to a non-volatile, thick crystalline slurry. Addition of petroleum ether in excess brought about precipitation of a fine solid. This solid was washed with 3× 50 ml. portions of petroleum ether and the dried residual solid amounted to 50.8 g. A filtrate was separated into a dense petroleum ether insoluble thick oil; weight=5.0 g. Petroleum ether was evaporated from the petroleum ether-soluble oil leaving a small amount of oil. The initial, crude, white solid obtained was recrystallized from 50/50 benzene-petroleum ether mixture to give prisms of crude adduct; M.P. 120–127°; after vacuum drying, M.P. 131–133° C.; crop I, weight=24.0 g. Upon dilution of the filtrate obtained from crop I with additional petroleum ether, crystals were formed, and repetition of the process three times afforded approximately 23 g. of crude maleic anhydride adduct identical with crop I.

The structure of the adduct was established as follows. Elemental analysis: Calculated for $C_{16}H_{20}O_3$: C, 73.8%, H, 7.7%, M.W., 260. Found: C, 74.1%; H, 7.3%. M.W. by M.S., 260; M.W. by titration, 260. I.R. showed absorption bands in the region of 5.40$\mu$ (med.) and 5.60$\mu$ (strong), which are indicative of the presence of an anhydride group. The compound was stable toward dilute, aqueous potassium permanganate and bromine solutions, suggesting the absence of ethylenic unsaturation; however, the C=C stretching vibration frequency, while absent in the infrared, was Raman active, and a strong band was exhibited at 1670 cm.$^{-1}$ in the latter spectrum, thus proving the presence of a carbon-carbon double bond. The N.M.R. spectrum exhibited four peaks corresponding to numbers of hydrogens, respectively, of 12, 4, 2, and 2. The chemical shifts are in agreement with 4-methylene hydrogens, $\alpha$ to C=C, 2 methine hydrogens $\alpha$ to C=C, 2 hydrogens $\alpha$ to C=O, and 12 hydrogens corresponding to cycloalkane types. Finally, X-ray crystallographic analysis firmly established the structure to be the following:

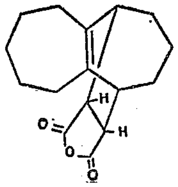

The (N-(p-bromophenyl)succinimide was prepared from the anhydride adduct for X-ray analysis by treatment of 2.60 g. of anhydride dissolved in 15 ml. xylene with 1.82 g. of p-bromoaniline in the presence of 2 ml. of $BF_3$-etherate. The mixture was heated to refluxing for several hours, cooled, and evaporated under vacuum. Needles were obtained, M.P. 171.5–173.5° C. Elemental analysis and infrared spectrum together with mass spectrum indicated this product to be the corresponding N-(p-bromophenyl)succinimide $C_{22}H_{24}O_2N_{Br}$.

From the foregoing, the structure of the maleic anhydride adduct is that which has been shown as Formula II. This adduct was derived from the bicyclodiene shown as Formula I. Other adducts of the bicyclic diene of the present invention can be formed such as the tetracyanoethylene adduct. Thus, while certain embodiments of the invention have been described, the invention obviously is not limited thereto.

The nature and objects of the present invention having been completely described and illustrated and the best mode thereof set forth, what I wish to claim as new and useful and secure by Letters Patent is:

An adduct composition of the following structure:

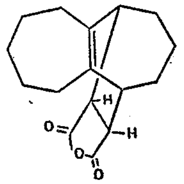

References Cited

UNITED STATES PATENTS

| | | | |
|---|---|---|---|
| 3,114,731 | 12/1963 | Rumscheidt et al. | 260—47 |
| 3,118,938 | 1/1964 | Stuart et al. | 260—563 |

NICHOLAS S. RIZZO, *Primary Examiner.*